(12) United States Patent
Maeda et al.

(10) Patent No.: US 6,424,870 B1
(45) Date of Patent: Jul. 23, 2002

(54) PARALLEL PROCESSOR

(75) Inventors: Hiromitsu Maeda, Yamato; Patrick Hamilton, Machida, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/117,867

(22) PCT Filed: Feb. 9, 1996

(86) PCT No.: PCT/JP96/00284

§ 371 (c)(1),
(2), (4) Date: Aug. 7, 1998

(87) PCT Pub. No.: WO97/29435

PCT Pub. Date: Aug. 14, 1997

(51) Int. Cl.[7] .............................................. G05B 19/18
(52) U.S. Cl. ................................ 700/4; 700/2; 700/12; 700/67; 712/20; 712/203; 712/215; 707/3; 707/102; 707/103; 709/237; 709/238; 710/108; 710/112; 370/400; 370/409
(58) Field of Search ........................... 700/2, 4, 12, 67; 712/20, 21, 22, 203, 215, 226, 229; 707/3, 4, 5, 6, 7, 102, 103, 104.1, 203; 370/400–404; 709/227, 237–238; 714/748, 749, 4; 710/108–112

(56) References Cited

U.S. PATENT DOCUMENTS

| | | | | |
|---|---|---|---|---|
| 4,399,531 A | * | 8/1983 | Grande et al. ................. | 370/60 |
| 5,041,963 A | * | 8/1991 | Ebersole et al. ............... | 700/2 |
| 5,153,884 A | * | 10/1992 | Lucak et al. ................. | 714/748 |
| 5,446,915 A | * | 8/1995 | Pierce ......................... | 700/19 |
| 5,475,856 A | * | 12/1995 | Kogge .......................... | 712/20 |
| 5,629,845 A | * | 5/1997 | Liniger ......................... | 700/67 |
| 5,742,499 A | * | 4/1998 | Reynolds ....................... | 700/2 |
| 5,790,398 A | * | 8/1998 | Horie ........................... | 700/4 |
| 5,808,886 A | * | 9/1998 | Suzuki .......................... | 700/4 |
| 5,826,095 A | * | 10/1998 | Jordan .......................... | 700/4 |
| 5,938,757 A | * | 8/1999 | Bertsch ......................... | 712/36 |
| 6,012,053 A | * | 1/2000 | Pant et al. .................... | 700/4 |
| 6,038,350 A | * | 3/2000 | Iwase et al. ................... | 700/4 |

FOREIGN PATENT DOCUMENTS

| | | |
|---|---|---|
| JP | 1-163861 | 6/1989 |
| JP | 4-92952 | 3/1992 |

* cited by examiner

*Primary Examiner*—Ramesh Patel
(74) *Attorney, Agent, or Firm*—Mattingly, Stanger & Malur, P.C.

(57) ABSTRACT

A parallel processor system has a plurality of nodes interconnected by a network for communication under control of a network interface controller of each node. The network interface controller includes a message reception controller for receiving a message from another node and judging illustratively the status of message reception and the need to return an acknowledge message; an acknowledge generating unit for generating an acknowledge message transmission request based on predetermined information in the message and the reception status when the return of an acknowledge message is judged to be necessary; and a message transmission controller for receiving an acknowledge the message transmission request and generating and returning an acknowledge message correspondingly. At the receiving node, the network interface controller can return an acknowledge message without processor intervention.

29 Claims, 8 Drawing Sheets

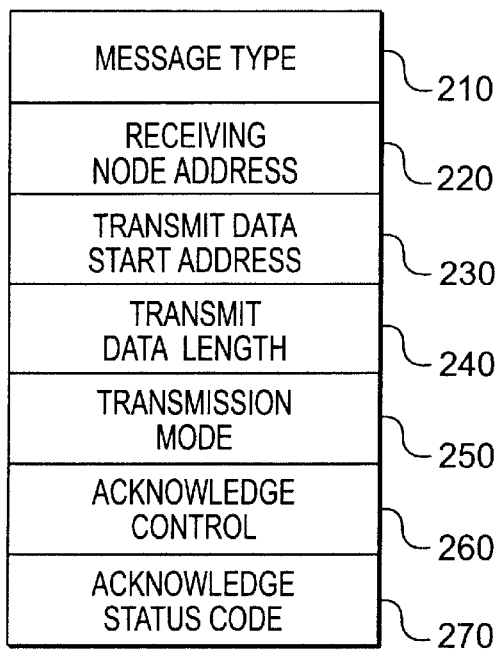
FIG. 2A
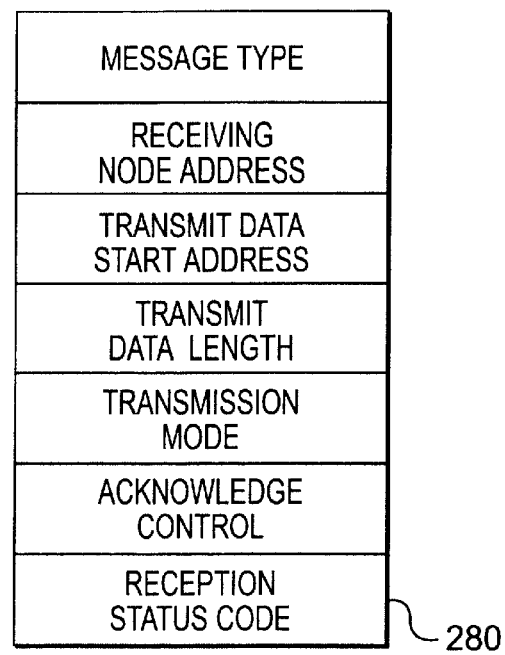
FIG. 2B
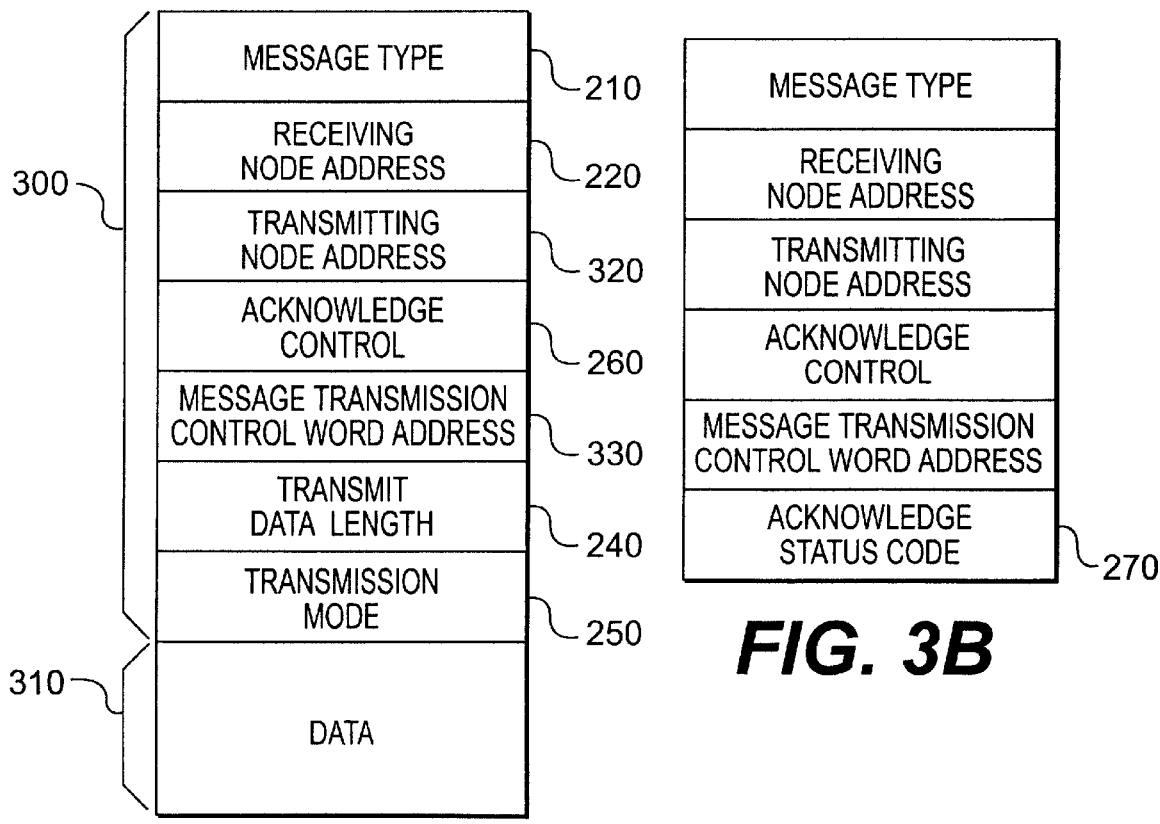
FIG. 3A
FIG. 3B

PARALLEL PROCESSOR

TECHNICAL FIELD

The present invention relates to a parallel processor having a plurality of nodes interconnected via a network, the nodes transferring messages therebetween. More particularly, the invention relates to a parallel processor wherein a node returns an acknowledge message upon receipt of a message.

BACKGROUND ART

One way of ensuring high reliability in message communication between nodes making up a parallel processor is for a receiving node (i.e., a node that has received a message) to return an acknowledge message to a transmitting node (which transmitted the message) acknowledging the receipt of each message.

If the transmitting node fails to receive within a predetermined period of time an acknowledge message from the receiving node, and if the original message was lost for some reason, the transmitting node may again generate the same message for retransmission to the receiving node, thus making up for the lost message. Upon receipt of an acknowledge message from the receiving node, the transmitting node will release from its memory a storage area which, containing the transmitted message and control information necessary for transmission of the message, has been protected against changes in anticipation of possible message re transmission.

FIG. 7 shows a typical constitution of a conventional parallel process or. In FIG. 7, n odes 1, 2, . . . N are interconnected via a network 70. Each node, connected to the network 70 in a way exemplified by the node 1, comprises a network interface controller 700 for control of communication with the network; a processor 720; a memory 730 for storing software and various items of information; and a memory controller 710 for controlling access requests to the memory 730 from the network interface controller 700 and processor 720.

In the parallel processor of the above constitution, suppose that the node 2 sends a message to the node 1. In such a case, the processor 720 of the node 1 conventionally executes message processing software upon receipt of the message. Once executed, the software prepares transmit data and a message transmission control word based on the content and the status of the message received from the node 2, generates an acknowledge message in accordance with the prepared transmit data and message transmission control word, and returns the generated acknowledge message to the node 2. More specifically, when the node 2 transmits a message to the node 1, the network interface controller 700 of the node 1 receives the message. The network interface controller 700 then checks to see if the received message is destined for its own node. If the message is found to be destined for its own node, the controller 700 stores the message into a predetermined area of the memory 730. Having stored the received message, the network interface controller 700 interrupts and notifies the processor 720 of the message reception. In turn, the processor 720 starts executing software for processing the received message. In carrying out the software, the processor 720 checks that the message currently stored in the memory 730 was normally received, verifies who sent the message, and performs other suitable interpretations to prepare a message transmission control word (needed to return an acknowledge message in response to the received message) and to generate an acknowledge message accordingly to be sent back to the transmitting node.

In the prior art, as described, normal reception of a message by the receiving node entails executing a number of steps for returning an acknowledge message: interrupting and notifying the processor of the receipt of the message, generating an acknowledge message, scheduling the message returning software, and having the message interpreted by the scheduled software. With these steps carried out, it takes a considerable time for the receiving node to return an acknowledge message to the transmitting node. This requires the transmitting node to maintain for an extended period of time the transmit data and the message transmission control word that were stored in memory, in anticipation of possible message retransmission. During that period, the transmitting node cannot re-allocate this memory for storing any other transmit data or message transmission control word for transmitting other messages. This may impede progress of message communication processing. Even if the bottleneck is bypassed by enlarging the memory capacity, provision of a sizable memory can pose other problems.

The need to prepare and return an acknowledge message causes the receiving node to have greater processor overheads than if no acknowledge message is returned. If the receiving node fails to receive a message normally, the node cannot return an acknowledge message except when message receipt information can be retained. Until an acknowledge message is received, the transmitting node cannot take measures to redress the error.

It is therefore an object of the present invention to provide a parallel processor comprising a plurality of nodes wherein any node, having received a message, returns an acknowledge message without recourse to its processor carrying out a message returning process.

The major benefit available from such a parallel processor is threefold. First, the transmitting node side may release at an earlier stage its storage area set aside to accommodate the transmit data and message transmission control word in anticipation of possible message retransmission. Second, the receiving node has its processor subjected to less burden when returning an acknowledge message. Third, the receiving node, if failing to receive a message normally, still returns an acknowledge message in as many cases as possible to the transmitting node so that the latter may handle the error accordingly.

DISCLOSURE OF INVENTION

In carrying out the invention and according to one aspect thereof, there is provided a parallel processor comprising at least two nodes and a network for interconnecting the nodes which communicate messages therebetween over the network; wherein each of the nodes has an interface controller for processing transmission and reception of messages to and from the network, and a processor for sending a message transmission request to the interface controller; and wherein the interface controller, independently of the processor, prepares and returns an acknowledge message based on predetermined information included in the message received from the network.

BRIEF DESCRIPTION OF DRAWINGS

FIGS. 2A and 2B are schematic views of formats of a message transmission control word used by each node in FIG. 1 for transmitting messages;

FIGS. 3A and 3B are schematic views of formats of a message packet used by the parallel processor of FIG. 1;

BEST MODE FOR CARRYING OUT THE INVENTION

The best mode for carrying out this invention will now be described with reference to the accompanying drawings.

Figure 1:
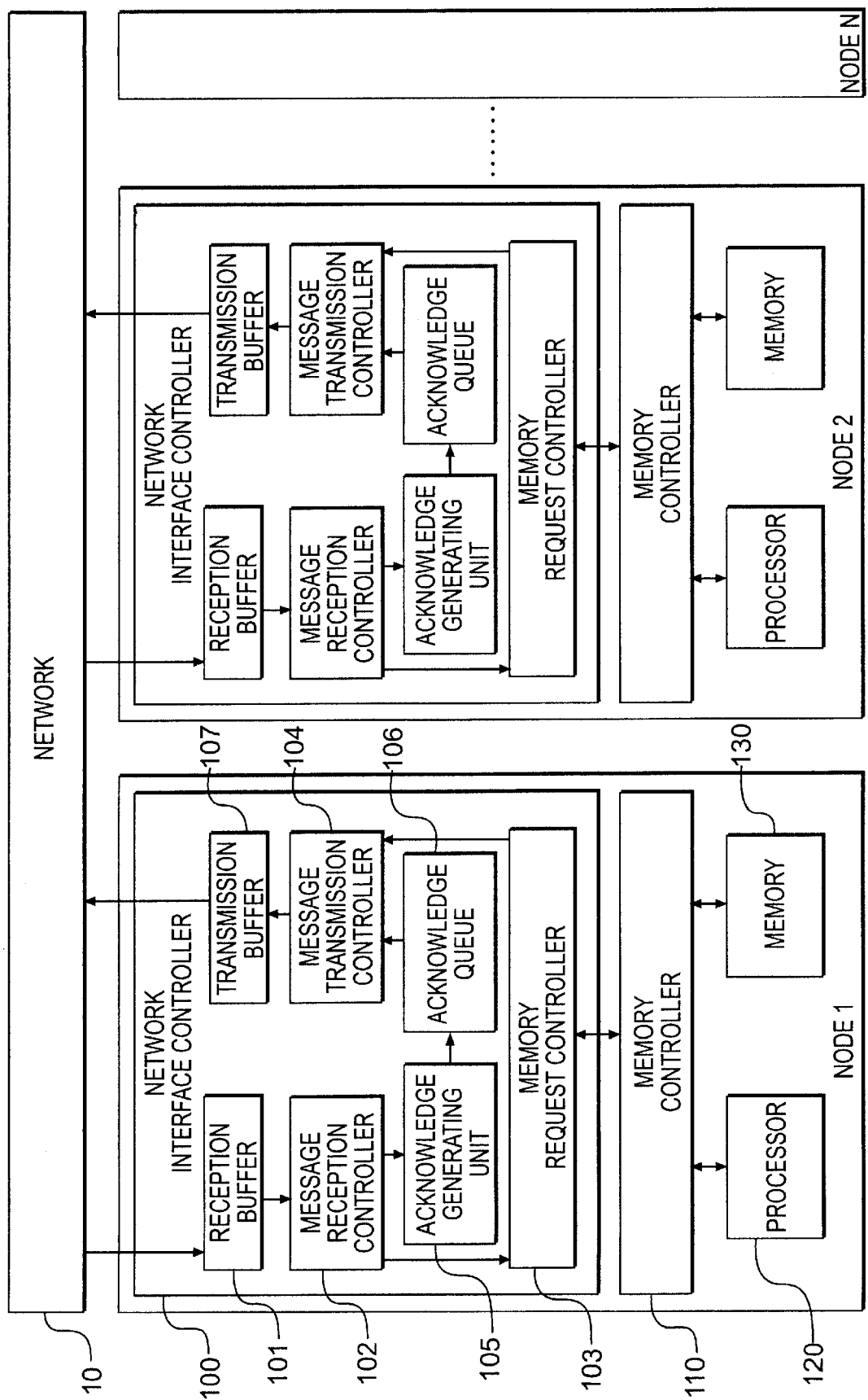
FIG. 1 is a block diagram of a parallel processor having a plurality of nodes and practiced as a first embodiment of the invention.

FIG. 1 shows a typical constitution of a parallel processor having as many as N nodes and practiced as the first embodiment of the invention. In FIG. 1, the parallel processor comprises nodes 1, 2, . . . , N (nodes 3 through N-1 are omitted) and a network 10 for interconnecting the nodes for communication therebetween.

Each node, connected to the network 10 in a way exemplified by the nodes 1 and 2, includes: a network interface controller 100 for controlling communications with the network 10; a processor 120; a memory 130 for storing software and various kinds of information; and a memory controller 110 for controlling access requests from the network interface controller 100 and processor 120 to the memory 130. The network interface controller 100 comprises: a reception buffer 101 for temporarily holding messages received over the network 10 so as to absorb a momentary difference between the flow of messages from the network 10 and the flow of messages to the memory 130; a memory request controller 103 for supplying the memory controller 110 with memory access requests to the memory 130; a message reception controller 102 which, upon receipt of a message from the reception buffer 101, checks that the received message is destined for its node, verifies that a message receiving area is available in the memory 130, and outputs a memory access request to the memory request controller 103 to store the received message into the message receiving area found available in the memory 130; a message transmission controller 104 which, upon receipt of a message transmission request from the processor 120, outputs a memory access request to the memory request controller 103 to retrieve from the memory 130 a message transmission control word containing information necessary for message transmission as well as transmit data, generates a message of a suitable format based on the retrieved message transmission control word and transmit data, and sends the generated message onto the network 10; a transmission buffer 107 for temporarily holding messages to be transmitted in order to absorb a temporary difference between the flow of messages from the message transmission controller 104 and the flow of messages to the network 10; an acknowledge generating unit 105 which, when the message reception controller 102 judges it necessary to return an acknowledge message to the transmitting node, acquires necessary information from within the message and reception status received from the message reception controller 102, and outputs an acknowledge message transmission request accordingly; and an acknowledge queue 106 for temporarily holding acknowledge message transmission requests from the acknowledge generating unit 105 if such requests cannot be sent immediately to the message transmission controller 104, and outputs an acknowledge message transmission request when the message transmission controller 104 becomes capable of transmitting a message.

The message transmission controller 104 arbitrates between an acknowledge message transmission request from the acknowledge queue 106 and a normal message transmission request from the processor 120. A message responding to either of the two transmission requests is output onto the network 10. In arbitrating between the two message transmission requests, the message transmission controller 104 gives precedence to the acknowledge message transmission request. This is because an acknowledge message transmission request, if its priority is low, will not trigger the transmission of an acknowledge message. The absence of an acknowledge message will result in an inability to receive new messages, which can bring about a deadlocked or a near-deadlocked state.

FIGS. 2A and 2B show typical formats of a message transmission control word prepared in the memory 130 of FIG. 1 and retrieved by the network interface controller 100 for use in message transmission. FIG. 2A indicates a format of a message transmission control word used to transmit normal messages, and FIG. 2B depicts a format of an acknowledge message transmission control word used by a processor to transmit an acknowledge message. In FIGS. 2A and 2B, like names designate like items of information with like meanings.

Of the information items shown in FIG. 2, a receiving node address 220, a transmit data start address 230 and a transmit data length 240 constitute information that is generally needed by the parallel processor to prepare in the memory 130 control information for message transmission and to transmit a message based on the prepared control information.

The receiving node address 220 is the address of the node for which the message is destined. This address is used to route the message to the destination node over the network 10. The transmit data start address 230 is the address of that area in the memory 130 which stores the data to be transmitted to the destination node. The transmit data length 240 indicates the length of the data placed in the memory 130 in preparation for transmission.

Unlike the information items above, a transmission mode 250 is not an item generally needed for message transmission; it may be used by the transmitting node that needs to know the start of message reception by the receiving node into a user's receiving area of the memory 130, as in the case of Synchronous Send of the MPI (communication library specification standardized by the Message Passing Interface Forum). The transmission mode 250 is placed in a message when transmitted to the receiving node. In response, the receiving node prepares a suitable acknowledge message based on the transmission mode value and reception status, and sends a suitable acknowledge message back to the transmitting node (different types of acknowledge message will be discussed later).

The remaining information items in FIGS. 2A and 2B are specific to this invention. A message type 210 is used to distinguish an acknowledge message from a normal message. The use of the message type 210 is not limited to distinguishing the normal message from the acknowledge message in a parallel processing wherein nodes communicate with each other on a one-to-one basis. Another parallel processor may have one node communicating with a plurality of nodes for broadcast communications that may be distinguished from one another by use of the message type 210.

An acknowledge control field 260 is used by the transmitting node to specify whether to return an acknowledge message via the network interface controller 100 upon receipt of a message, and whether to interrupt and notify the processor of an acknowledge message if that message is received. The parallel processor generally performs diverse kinds of communication. In some cases, it is not mandatory to return an acknowledge message via the network interface controller 100 (that is, an acknowledge message is either returned through processing by the processor or not returned at all). Using the acknowledge control field 260 allows the transmitting node to determine whether to return an acknowledge message via the network interface controller 100 without processor intervention.

Upon receipt of an acknowledge message, whether or not to notify the processor thereof is determined in one of two ways: either in accordance with the value of the acknowledge control field 260 in the message transmission control word retrieved upon message transmission (Case 1), or on the basis of the value of the same field in the message transmission control word that is retrieved again when the acknowledge message is received (Case 2). More specifically, the acknowledge control field 260 is placed in a message that is transmitted to the receiving node. If the value of the acknowledge control field 260 designates the return of an acknowledge message, the receiving node returns an acknowledge message accordingly. At this point, the acknowledge control value in the message is placed unchanged into the acknowledge message that is sent back to the transmitting node. In the Case 1 above, the transmitting node notifies the processor of the receipt of an acknowledge message in accordance with the value of the acknowledge control field 260 (designated upon message transmission) in the received acknowledge message. In the Case 2 above, the transmitting node upon receiving an acknowledge message retrieves again the message transmission control word from the memory and notifies the processor of an acknowledge message receipt on the basis of the value of the acknowledge control field 260 (designated upon transmission of a message or changed after message transmission) in the message transmission control word that is retrieved again from the memory. Illustratively, suppose that whether or not to notify the processor of message receipt is determined by the transmitting node on the basis of the value of the acknowledge control field 260 in the message transmission control word retrieved again when the acknowledge message is received (Case 2); that the return of an acknowledge message is awaited for a predetermined period of time; and that the acknowledge control value 260 is changed upon elapse of that predetermined period of time without the receipt of an acknowledge message. In such a case, it is possible to eliminate the need to interrupt and notify the processor depending on how the arrival of an acknowledge message is timed.

Finally, an acknowledge status code 270 is used to identify the value of a transmission mode and the type of an acknowledge message corresponding to the status of message reception, as will be described later. When an acknowledge message is returned, the acknowledge status code value included in the returned acknowledge message is written unchanged to this acknowledge status code field 270 by the network interface controller 100.

The processor of the node that has received the acknowledge message performs suitable processing in accordance with the value of the acknowledge status code 270 placed in the message transmission control word.

The acknowledge message transmission control word shown in FIG. 2B has no need for the acknowledge status code field because no acknowledge message is returned. Instead, a reception status code field 280 is provided. Where it is necessary for the processor to generate and return an acknowledge message, the reception status code field 280 is used to notify the transmitting node whether the message was placed into the user's receiving area or into some other temporary reception area and whether any error occurred during message reception.

FIGS. 3A and 3B depict formats of a message packet created by use of the message transmission control word discussed above. This parallel processor embodying the invention communicates messages in packet form between nodes. As shown in FIG. 3A, a message packet comprises a packet header 300 and a packet body 310. FIG. 3A shows a packet format of a normal message while FIG. 3B indicates a packet format of an acknowledge message. In FIGS. 3A and 3B, like names designate like items of information with like meanings. Of the reference numerals in FIGS. 3A and 3B, those already used in FIGS. 2A and 2B designate like or corresponding items of information.

As illustrated in FIGS. 3A and 3B, the packet header 300 comprises a message type 210, a receiving node address 220, an acknowledge control field 260, a transmitting node address 320, a message transmission control word address 330, a transmit data length 240 and a transmission mode 250. The transmit data length 240 and transmission mode 250 may be replaced by an acknowledge status code 270.

The message type of the acknowledge message generated and returned by the network interface controller 100 is the same as that of the acknowledge message generated and returned by the processor.

In FIGS. 3A and 3B, the transmitting node address 320 allows the receiving node to know the source of the transmission. In addition, the transmitting node address 320 may be used by the network interface controller 100 to return an acknowledge message without processor intervention.

The message transmission control word address 330 designates the address of that message transmission control word in the memory 130 which is retrieved by the network interface controller 100 upon message transmission. The message transmission control word address 330 is used by the network interface controller 100 upon receipt of an acknowledge message to write the acknowledge status code 270 (contained in the acknowledge message) directly to the acknowledge status code field of the message transmission control word.

When the network interface controller 100 or processor 120 returns an acknowledge message, the message transmission control word address 330 held in the initial message is placed unchanged into the acknowledge message. This makes it possible for the transmitting node having received the acknowledge message to gain access to the message transmission control word to which to write the acknowledge status code.

The acknowledge status code 270 indicates the type of an acknowledge message. If an acknowledge message is returned by the network interface controller 100, the acknowledge status code 270 is created by the network interface controller 100 in accordance with the value of the transmission mode 250 in the message packet header 300 and with the status of message reception. If an acknowledge message is returned through processing by the processor, the reception status code 280 held in the acknowledge message transmission control word is used unmodified by the network interface controller 100.

Acknowledge messages come in five types:
(1) An acknowledge message indicating that the transmitted message was placed in the user's receiving area.
(2) An acknowledge message indicating that the transmitted message was not placed in the user's receiving area, but was placed in a temporary reception area which is managed by the network interface controller 100.
(3) An acknowledge message indicating that the transmitted message was not placed in the user's receiving area, but neither could it be accommodated in a temporary reception area managed by the network interface controller 100, due to lack of available space.
(4) An acknowledge message indicating the occurrence of a hardware error on the network 10 or in the network interface controller 100.
(5) An acknowledge message indicating that the transmitted message was not received because of the lack of an access right.

The packet body 310 is made up of data. The data are to be transmitted to the destination node; they are read over the transmit data length from that address in the memory 130 which is designated by the transmit data start address in the message transmission control word.

What takes place when messages are communicated between nodes of the inventive parallel processor above will now be described. In the example that follows, the node 2 forwards a message to the node 1 in a message transmitting operation.

Figure 8:
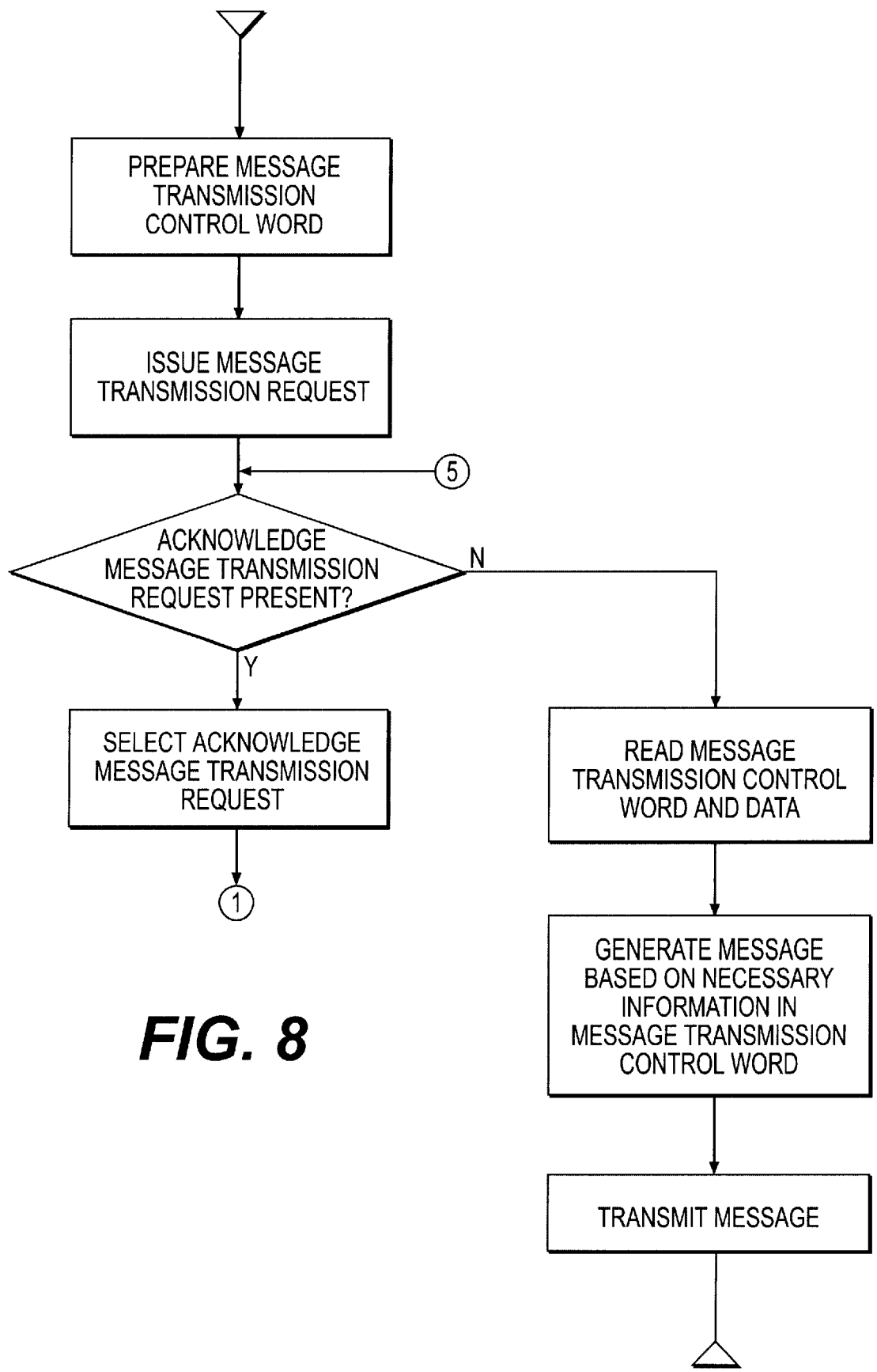
FIG. 8 is a flowchart of steps whereby a node of the first embodiment transmits a message.

FIG. 8 is a flowchart of steps whereby a message is transmitted. As depicted in the flowchart, the message transmitting operation is initiated by the processor 120 of the node 2 executing suitable software. The software allocates target data and a necessary message transmission control word in predetermined areas of the memory 130 in preparation for message transmission to the node 1.

With the data and message transmission control word thus prepared, the processor 120 sets to a dedicated address register (not shown) the address of that area in the memory 130 which accommodates the message transmission control word, and outputs a message transmission request to the message transmission controller 104 in the network interface controller 100.

At this point, the processor 120 designates a message type value 210 indicating a normal message, a receiving node address 220 indicating the unique address of the node 1, and a transmitting node address 320 indicating the unique address of the node 2. In this example, the acknowledge control field 260 is set with a value indicating the need for the network interface controller 100 to return an acknowledge message upon receipt of the transmitted message.

On receiving the message transmission request above, the message transmission controller 104 sends a memory access request to the memory request controller 103 using the address set in the address register. In turn, the memory request controller 103 forwards the memory access request to the memory controller 110. Given the request, the memory controller 110 gains access to the memory 130, reads the message transmission control word therefrom, and transmits the retrieved word to the message transmission controller 104 via the memory request controller 103.

Figure 4:
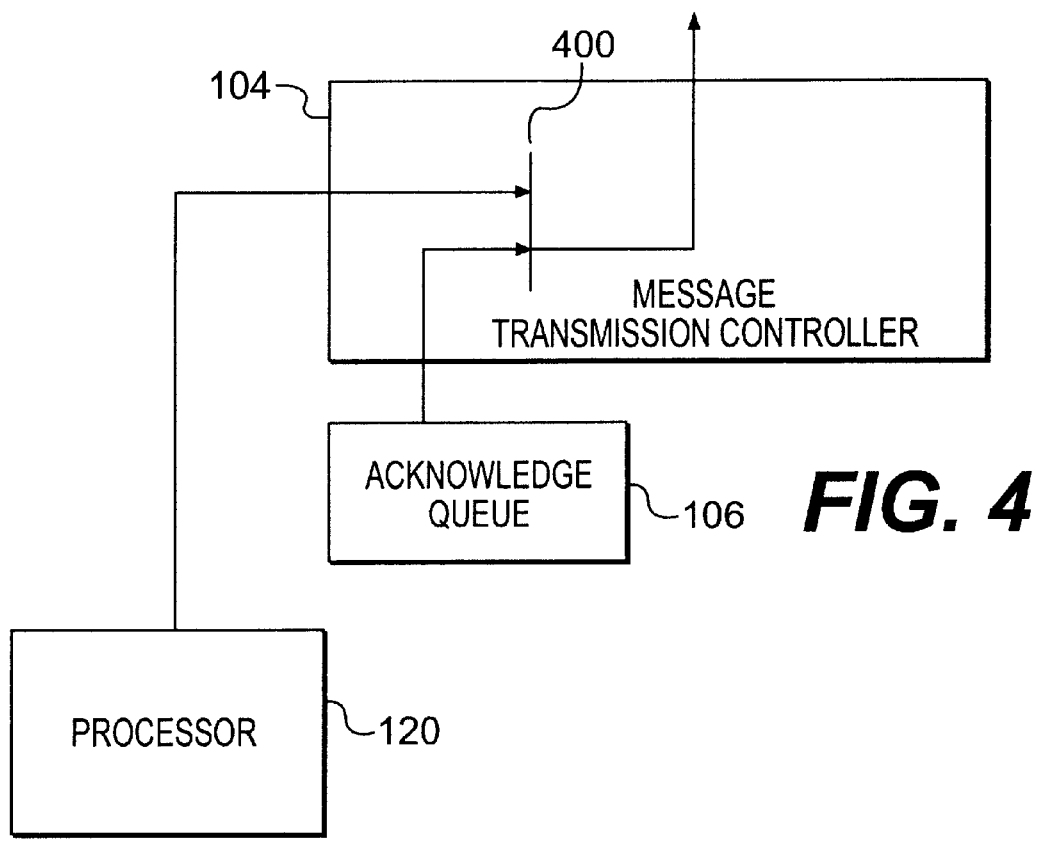
FIG. 4 is a schematic view of a message transmission controller included in each node of FIG. 1.

The message transmission controller 104 includes an arbitrating unit 400 shown in FIG. 4. If an acknowledge message transmission request coming from the acknowledge generating unit 105 via the acknowledge queue 106 is in conflict with a normal message transmission request from the processor 120, the arbitrating unit 400 arbitrates between the two requests and gives precedence to the acknowledge message transmission request so that it is serviced first. In other words, the message transmission controller 104 receives a message transmission request from the processor 120 only if there is no acknowledge message transmission request from the acknowledge generating unit 105.

The message transmission controller 104 then sends the memory access request to the memory request controller 103 using the transmit data start address 230 and transmit data length 240 in the retrieved message transmission control word. The memory request controller 103 forwards the memory access request to the memory controller 110. On receiving the request, the memory controller 110 accesses the memory 130 to read the transmit data therefrom, and sends the retrieved data to the message transmission controller 104 through the memory request controller 103.

On the basis of the retrieved message transmission control word and transmit data, the message transmission controller 104 generates a message destined for the node 1. Specifically, the message transmission controller 104 assembles a packet header by putting together the message type 210, receiving node address 220, transmit data length 240, transmission mode 250, and acknowledge control value 260 in the message transmission control word; as well as the transmitting node address 320 and message transmission control word address 330. The transmit data are added to the packet header thus assembled, whereby a message packet is created.

The message transmission controller 104 transmits the created message to the network 10 through the transmission buffer 107.

Figure 9:
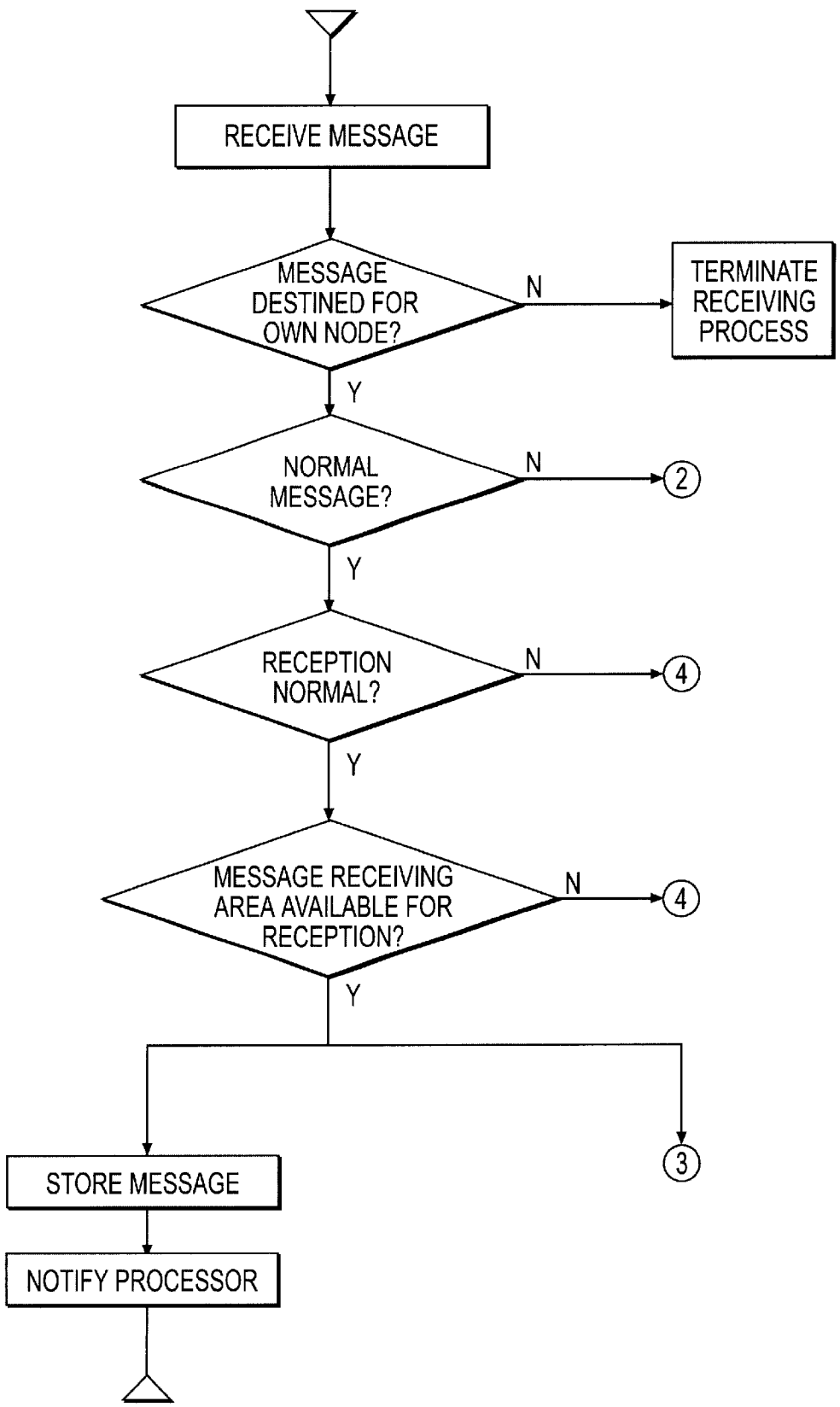
FIG. 9 is a flowchart of steps whereby a node of the first embodiment receives a message.

How a message is received will now be described. FIG. 9 is a flowchart of steps whereby the network interface controller 100 in a node receives a message.

A transmitted message is routed to the node 1 by the network 10 referencing the receiving node address in the packet header. The routed message is received initially by the reception buffer 101 in the network interface controller 100 of the node 1. The message is forwarded to the message reception controller 102.

Upon receipt of the message from the reception buffer 101, the message reception controller 102 references the receiving node address 220 in the packet header to ascertain that the message is destined for its node. The message reception controller 102 then refers to the message type 210 to see whether the message is a normal message or an acknowledge message. It is assumed here that the received message is a normal message. How an acknowledge message is received will be described later.

With the message judged to be a normal message, the message reception controller 102 checks the packet length and other parameters to see if the message has been normally received. When the reception of the message is found to be normal, a check is made to see if a message receiving area is available in the memory 130. If a memory area for accommodating the message is found, the message reception controller 102 sends a memory access request to the memory request controller 103 so that the message will be placed into the available area. The memory request controller 103 forwards the memory access request to the memory controller 110. Given the request, the memory controller 110 gains access to the memory 130 to place the message into the message receiving area therein.

With the receipt of the message completed, the message reception controller 102 notifies the processor 120 thereof illustratively by means of an interruption. When notified of the message receipt completion, the processor 120 carries out software for received message processing. The software interprets the received message in the message receiving area of the memory 130 and moves the message to the user's receiving area. This completes the message receiving process.

With this embodiment, the message reception controller 102 has put the received message into the message receiving area in the memory 130. Alternatively, the received message may be stored directly into the user's receiving area. In the alternative case, there is no need for the steps in which the processor proceeds to store the received message into the user's receiving area.

If the message is not judged to be received normally, or if the attempt to receive the message is judged to have failed because no message receiving area was available in the memory 130, the message reception controller 102 notifies the transmitting node thereof upon the return of an acknowledge message, to be described later. With the acknowledge message sent back, the message reception controller 102 terminates its receiving process.

Figure 10:
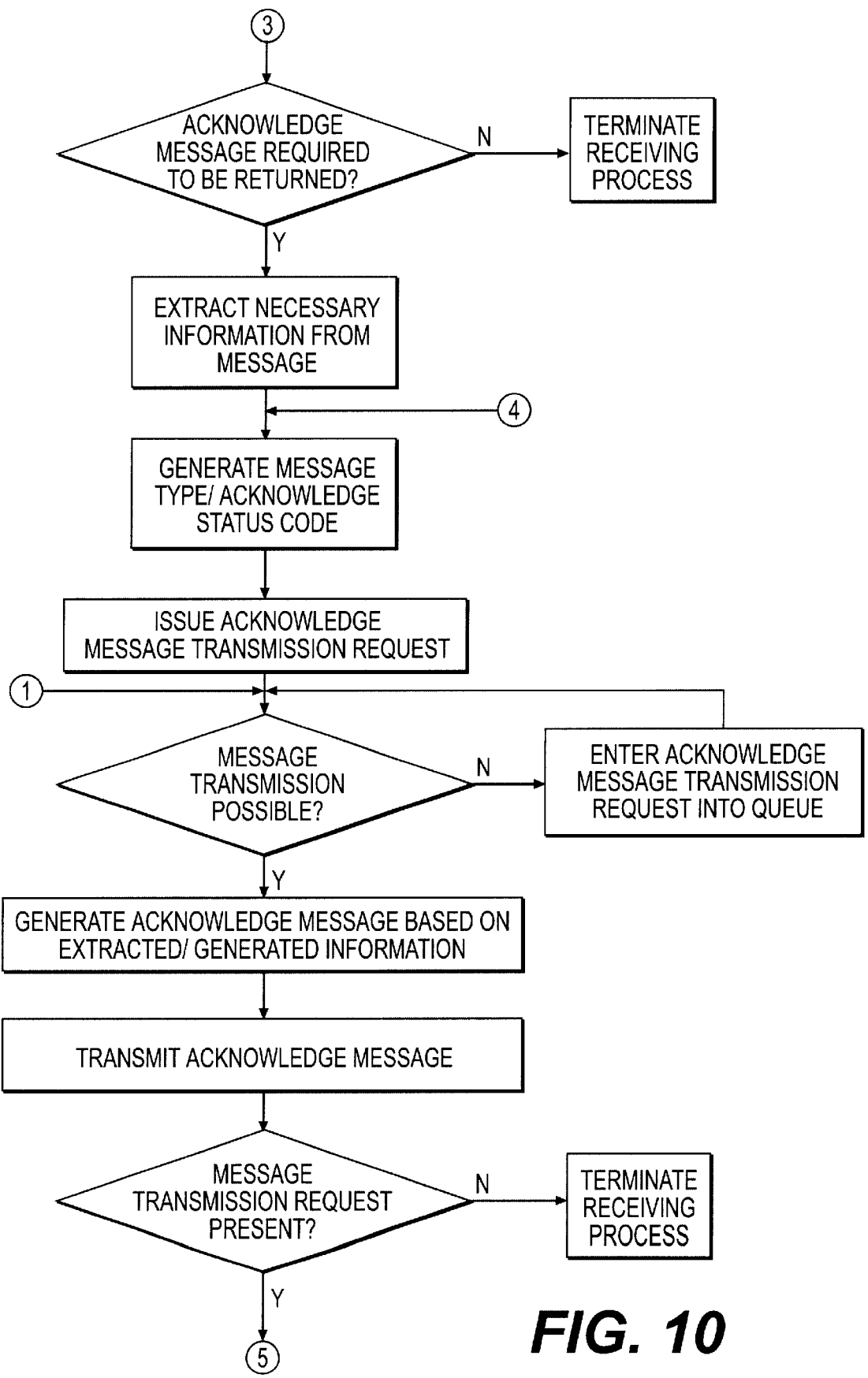
FIG. 10 is a flowchart of steps whereby a node of the first embodiment returns an acknowledge message.

How an acknowledge message is returned will now be described. FIG. 10 is a flowchart of steps whereby the network interface controller 100 of a node returns an acknowledge message.

The message reception controller 102 sends a memory access request to the memory request controller 103 to place the received message into the message receiving area, as described. At the same time, the message reception controller 102 references the acknowledge control field 260 in the packet header to determine whether an acknowledge message needs to be returned in response to the received message. If the acknowledge control field 260 is found to have a value designating the return of an acknowledge message, the message reception controller 102 recognizes the need for sending back an acknowledge message. If the message type 210 indicates an acknowledge message or if the acknowledge control field 260 has a value not designating the return of an acknowledge message, then the message reception controller 102 recognizes no need for returning an acknowledge message.

With the first embodiment, as described above, the message type 210 points to a normal message and the acknowledge control field 260 indicates the need for the network interface controller 100 to return an acknowledge message. Thus the message reception controller 102 judges that an acknowledge message needs to be returned in reply to the received message.

With that judgment made, the message reception controller 102 extracts from the message the transmitting node address 320, acknowledge control value 260, message transmission control word address 330, and transmission mode 250 making up the packet header. These items of information, along with the acknowledge message return request, the receiving node address and the status of message reception are sent by the message reception controller 102 to the acknowledge generating unit 105.

Figure 5:
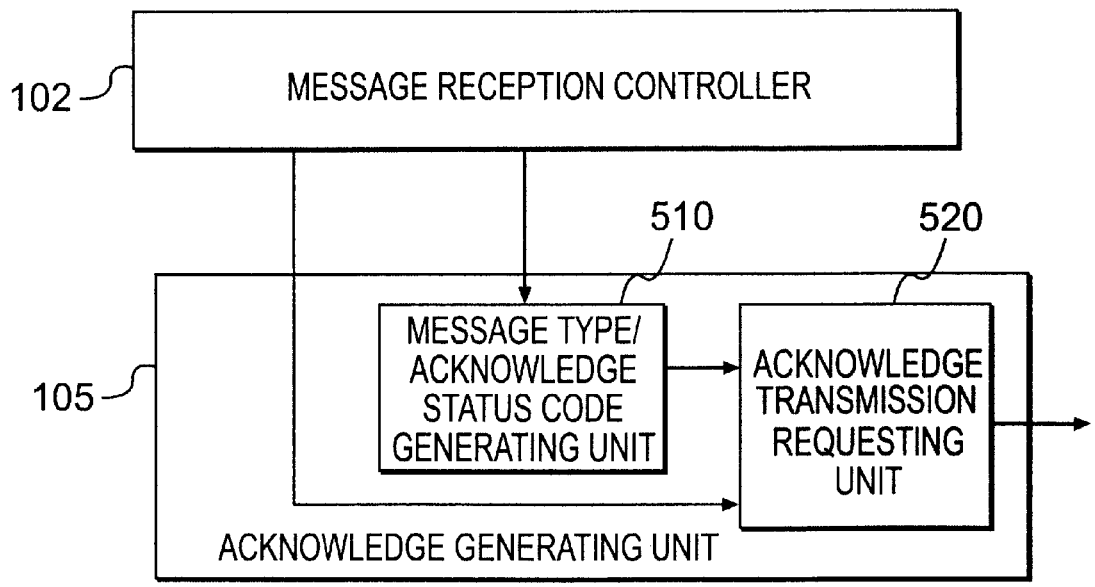
FIG. 5 is a schematic view of an acknowledge message generating unit included in each node of FIG. 1.

As shown in FIG. 5, the acknowledge generating unit 105 includes a message type/acknowledge status code generating unit 510 and an acknowledge transmission requesting unit 520. On receiving the acknowledge message return request, the transmission mode 250 and the status of message reception from the message reception controller 102, the message type/acknowledge status code generating unit 510 generates a message type 210 and an acknowledge status code 270 indicating one of the above-mentioned five acknowledge messages (1) through (5) on the basis of the transmission mode value and the reception status. The message type 210 takes on a value indicating that the message type is an acknowledge message.

The items of information received from the message reception controller 102 except for the transmission mode 250 and the reception status are sent to the acknowledge transmission requesting unit 520 along with the message type 210 and acknowledge status code 270 generated as described. Given the information, the acknowledge transmission requesting unit 520 forwards the received items to the message transmission controller 104 together with the acknowledge message transmission request. The transmitting node address received at this point is the receiving node address 220, and the new receiving node address is the transmitting node address 320.

The acknowledge message transmission request from the acknowledge generating unit 105 is placed temporarily into the acknowledge queue 106. If the transmission request can be sent to the message transmission controller 104 (i.e., if the message transmission controller 104 is ready to transmit a message), the acknowledge queue 106 immediately forwards the acknowledge message transmission request to the message transmission controller 104. If the transmission request cannot be sent for the moment to the message transmission controller 104 (i.e., if the message transmission controller 104 is not ready because, for example, it is busy transmitting another message), the acknowledge queue 106 retains the acknowledge message transmission request. The queued request is subsequently passed on to the message transmission controller 104 when the latter is ready to transmit a message.

Whenever an acknowledge message transmission request is sent in, the message transmission controller 104 gives precedence to that request upon its receipt over an ordinary message transmission request. The message transmission controller 104 creates an acknowledge message based on the information that was sent along with the transmission request. Specifically, an acknowledge message packet is assembled by use of the message type 210, receiving node address 220, transmitting node address 320, acknowledge control value 260, message transmission control word address 330, and acknowledge status code 270. The acknowledge message packet thus assembled is transmitted to the network 10 through the transmission buffer 107. This completes the acknowledge message returning process performed by the network interface controller 100.

Figure 11:
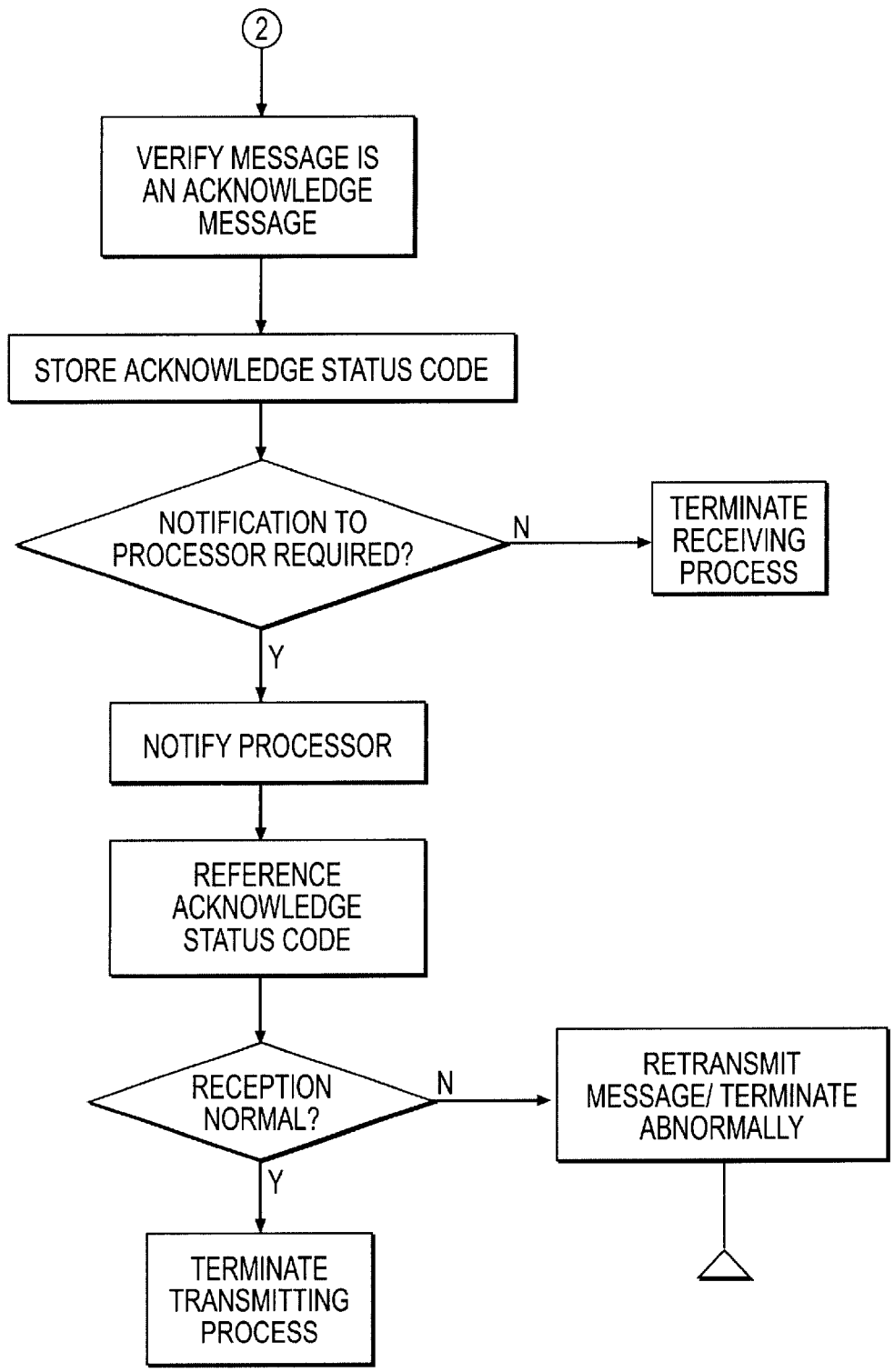
FIG. 11 is a flowchart of steps whereby a node of the first embodiment receives an acknowledge message.

How an acknowledge message is received will now be described. FIG. 11 is a flowchart of steps whereby the network interface controller 100 and processor 120 of a node receive an acknowledge message.

A transmitted acknowledge message is routed to the node 2 by the network 10. As with normal messages, the routed acknowledge message is received by the reception buffer in the network interface controller 100 of the node 2 before being forwarded to the message reception controller 102.

On receiving the acknowledge message, the message reception controller 102 references the message type 210, receiving node address 220 and transmitting node address 320 within the message to verify that the message is an acknowledge message returned in response to the message transmitted earlier by the node.

The message reception controller 102 then references the message transmission control word address 330. Following the reference, the message reception controller 102 sends a memory access request to the memory request controller 103 in order to write the value of the acknowledge status code 270 from the message into the acknowledge status code field within that message transmission control word in the memory 103 which is designated by the referenced address. The memory request controller 103 forwards the memory access request to the memory controller 110. Given the request, the memory controller 110 accesses the memory 130 to write the value of the acknowledge status code 270 from the message to the acknowledge status code field of the message transmission control word in the memory.

The message reception controller 102 references the acknowledge control value 260 to determine if it is necessary to notify the processor 120 that the acknowledge message has been received. If the acknowledge control value 260 is found to be one designated at the time of message transmission, i.e., a value designating the need to notify the processor of message reception, then the message reception controller 102 recognizes the need for the notification to the processor 120. In that case, the message reception controller 102 interrupts and notifies the processor 120 that the acknowledge message has been received. If the acknowledge control value 260 is found to specify no need for notification to the processor 120, the message reception controller 102 recognizes the absence of the need and terminates the acknowledge message receiving process accordingly.

The acknowledge control value 260 may be one that designates the need to notify the processor of message receipt in accordance with the acknowledge control value 260 inside the message transmission control word in effect when the acknowledge message is received. In that case, the message reception controller 102 retrieves the message transmission control word by use of the message transmission control word address from the message, and references the acknowledge control value 260 within the retrieved word. As in the example above, if the acknowledge control value is found to specify the need for notification to the processor 120, the processor 120 is interrupted and notified of the message receipt; if the acknowledge control value is one that designates no need for notification to the processor 120, the message reception controller 102 recognizes the absence of the need and terminates the acknowledge message receiving process correspondingly.

When notified that the acknowledge message has been received, the processor 120 references the acknowledge status code 270 inside the message transmission control word in the memory 130 so as to verify the acknowledge message type. If the acknowledge status code points to the acknowledge message type (1) or (2) mentioned earlier, this means that the message has been received normally by the destination node. In that case, the processor 120 releases that storage area in the memory 130 which has kept intact the transmit data and the message transmission control word in anticipation of possible message retransmission, and terminates the message transmitting process.

If the acknowledge status code is found to designate the message type (3) or (4) mentioned above, this means that the message was not received normally by the destination node. In that case, the processor 120 attempts to retransmit the message using the transmit data and message transmission control word preserved in the memory. It should be noted that the message type (3) signifies a lack of the message receiving area in the receiving node. This requires the transmitting node to put on hold the retransmission of the message; the message is retransmitted when a sufficient receiving area is allocated on the side of the receiving node.

If the acknowledge status code is found to indicate the message type (5) mentioned earlier, this signifies the occurrence of an error. In that case, the currently executing software is terminated abnormally.

If the acknowledge control value 260 referenced by the message reception controller 102 does not designate the return of an acknowledge message, the message reception controller 102 judges it unnecessary to return the acknowledge message, as discussed above. Thus the network interface controller 100 does nothing to initiate the return of an acknowledge message. At this point, one of two things takes place. Either no acknowledge message is returned from receiving node 1 to the transmitting node 2, or the processor 120 of the receiving node 1 acts to generate and return an acknowledge message. In the latter case, as described in connection with the background art, the processor 120 executes suitable software for received message processing, prepares a message transmission control word based on the contents of the received message and the status of message reception, and creates and transmits an acknowledge message in the normal message packet format shown in FIG. 3A.

Furthermore, it may be necessary for the transmitting node to know if the receipt of a message has begun in the user's receiving area on the part of the receiving node, as in the case of Synchronous Send of the MPI mentioned earlier. In such a case, even if the transmitting node receives an acknowledge message indicating the message type (2) above from the network interface controller of the receiving node, the reception of the message has yet to start in the user's receiving area of the receiving node. It follows that the transmitting node cannot complete its message transmitting process. In this case, when the user's receiving area of the receiving node starts receiving the message, the processor 120 of the receiving node executes suitable software for acknowledge message return. In so doing, the processor 120 prepares in the memory 130 an acknowledge message transmission control word shown in FIG. 2B, sets to a dedicated address register the address of that area in the memory 130 which accommodates the acknowledge message transmission control word, and sends an acknowledge message transmission request to the message transmission controller 104.

Upon receipt of the request, the message transmission controller 104 retrieves the acknowledge message transmission control word using the address set in the address register. The message transmission controller 104 then assembles an acknowledge message packet shown in FIG. 3B on the basis of the retrieved acknowledge message transmission control word, the message transmission control word address from the message, and the own node address. At this point, the reception status code indicating the abovementioned message type (1) in the acknowledge message transmission control word is set unmodified to the acknowledge status code field. The acknowledge message thus created is sent by the message transmission controller 104 to the network 10. When the acknowledge message is routed to the transmitting node, the latter receives the message by carrying out the receiving process described above. When verifying that the status code of the received message indicates the normal message type (1), the transmitting node releases that storage area in the memory which has kept intact the transmit data and the message transmission control word in anticipation of possible message retransmission, and terminates the message transmitting process, as described. In this manner, the first embodiment allows messages to be exchanged between its nodes.

The second embodiment of the invention will now be described. This embodiment is a variation of the parallel processor depicted in FIG. 1. In the second embodiment wherein the acknowledge queue 106 remains full for a predetermined period of time, the processor picks up and manages an acknowledge message transmission request not accommodated by the queue. When the acknowledge queue 106 has a vacancy, the processor again enters the acknowledge message transmission request into that queue.

Figure 6:
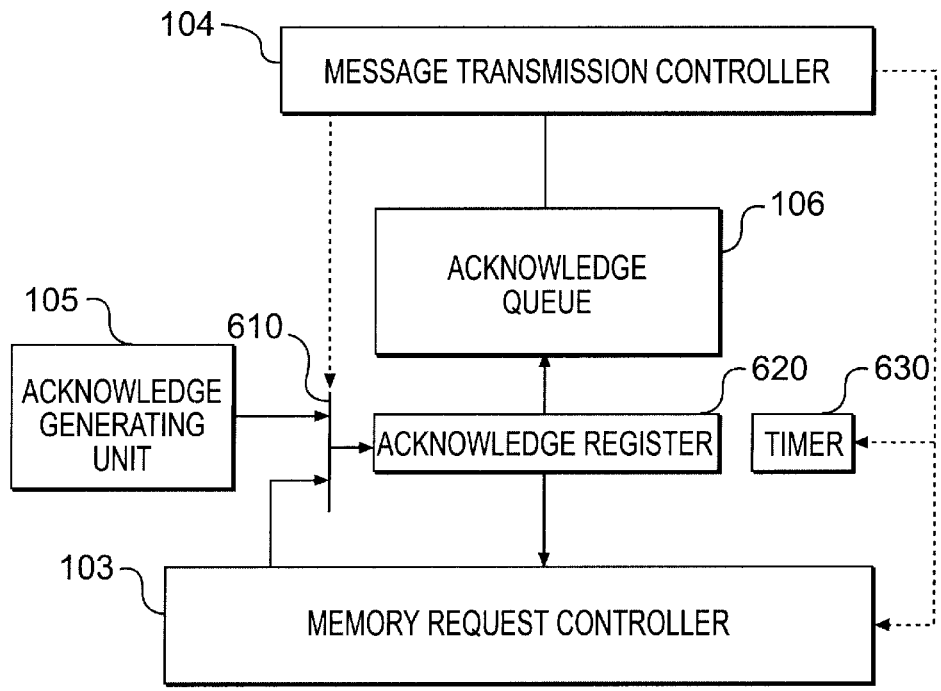
FIG. 6 is a schematic view of an acknowledge queue included in a node of a parallel processor practiced as a second embodiment of the invention.
Figure 7:
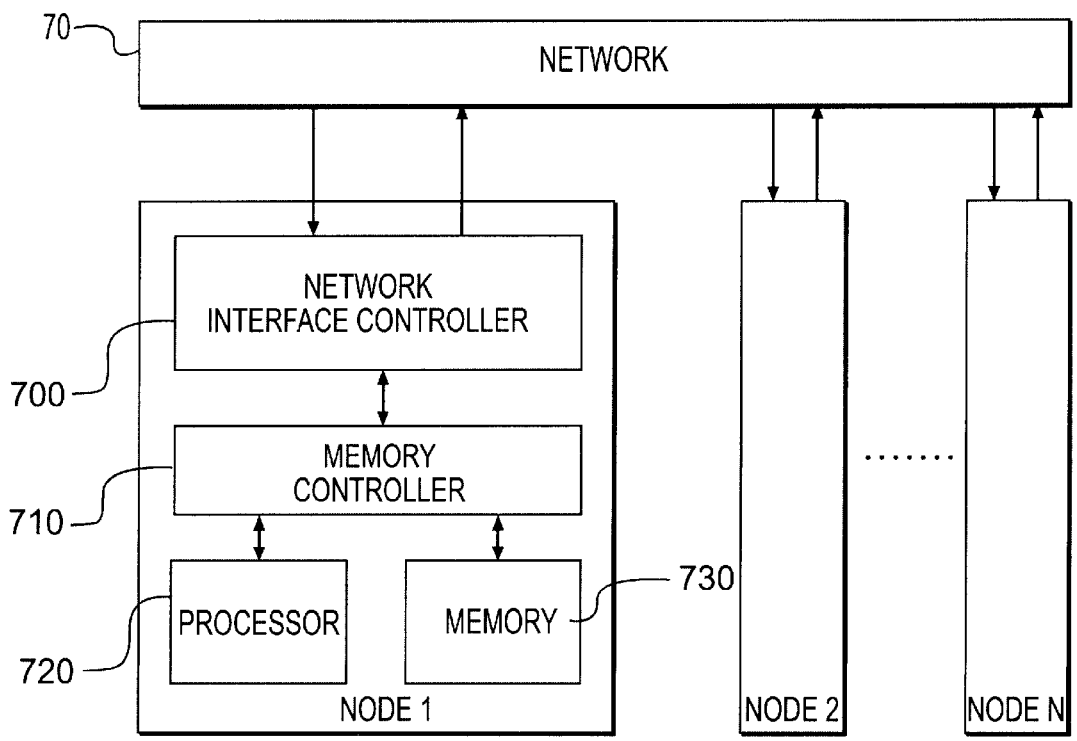
FIG. 7 is a block diagram of a conventional parallel processor comprising a plurality of nodes.

FIG. 6 schematically shows an acknowledge queue included in a node of the second embodiment of the invention. Of the reference numerals in FIG. 6, those already used in FIG. 1 designate like or corresponding parts. In FIG. 6, reference numeral 620 denotes a memory-mapped acknowledge register to and from which data may be written and read by the processor 120 of the node through the memory controller 110 and through the memory request controller 103 in the network interface controller 100. Reference numeral 610 represents a selector for selecting one of two requests: a write request sent by the processor 120 to the acknowledge register 620, and an acknowledge message transmission request by the acknowledge generating unit 105 to the register 620. Reference numeral 630 stands for a timer that starts counting when the acknowledge queue 106 and acknowledge register 620 become full of acknowledge message transmission requests, the count value being used to check if the acknowledge queue 106 and acknowledge register 620 remain full for a predetermined period of time.

The selector 610 is controlled to keep selecting acknowledge message transmission requests from the acknowledge generating unit 105 until a time-out occurs on the timer 630. All the components above are controlled in operation by the message transmission controller 104.

How the second embodiment works will now be described. Normally, an acknowledge message transmission request from the acknowledge generating unit 105 is selected by the selector 610 and placed temporarily into the acknowledge register 620. The request is then entered into the acknowledge queue 106. If the acknowledge queue 106 is full and cannot accommodate any more request, the acknowledge message transmission request is retained in the acknowledge register 620. When the acknowledge queue 106 has a vacancy, the transmission request in the acknowledge register 620 is entered into the acknowledge queue 106.

A transmission request, placed in the acknowledge queue 106, is removed from there and sent to the message transmission controller 104 if the latter is ready to transmit a message.

The timer 630 starts counting when the acknowledge queue 106 and the acknowledge register 620 are each filled with a maximum allowable number of acknowledge message transmission requests. The timer 630 counts the period of time during which the queue 106 and register 620 remain full. Upon elapse of a predetermined period of time since the start of the timer counting, a time-out occurs on the timer 630.

On detecting the time-out of the timer 630, the message transmission controller 104 generates an acknowledge register read-out event and notifies the processor 120 of that event by interruption. Given the acknowledge register read-out event, the processor 120 reads the acknowledge message transmission request from the acknowledge register 620 and enters the retrieved request into a processor-managed queue in the memory 130. At this point, the processor 120 notifies the message transmission controller 104 that the acknowledge message transmission request has been retrieved.

The notification causes the message transmission controller 104 to judge that the acknowledge register 620 has a vacancy. It is now possible to accept the acknowledge message transmission request from the acknowledge generating unit 105.

Once the acknowledge message transmission request is entered into the processor-managed queue, the processor 120 remembers the request being queued. At the same time, the processor 120 ensures that no normal message transmission request other than the acknowledge message transmission request will reach the message transmission controller 104.

In the case that, the acknowledge register 620 is vacant, and the acknowledge message transmission request in the acknowledge queue 106 still cannot be sent to the message transmission controller 104, and another acknowledge message transmission request is ready to be sent from the acknowledge generating unit 105, then the second acknowledge message transmission request is placed into the acknowledge register 620. The message transmission controller 104 again generates an acknowledge register read-out request event. This event is handled in the same manner as described earlier.

If no acknowledge message transmission request is ready to be sent from the acknowledge generating unit 105 immediately after the acknowledge register 620 has become vacant, the message transmission controller 104 generates an acknowledge register write request event, and notifies the processor 120 of this request by interruption. At the same time, the message transmission controller 104 causes the selector 610 to select the acknowledge register write request from the processor 120.

Upon receipt of the acknowledge register write event, the processor 120 retrieves the acknowledge message transmission request from the processor-managed queue and writes the retrieved request to the acknowledge register 620. The processor 120 then notifies the message transmission controller 104 that the acknowledge message transmission request has been written.

The notification allows the message transmission controller 104 to judge that the acknowledge message transmission request is placed into the acknowledge register 620. In turn, the message transmission controller 104 causes the selector 610 to select the acknowledge message transmission request from the acknowledge generating unit 105.

When the acknowledge message transmission request is removed from the acknowledge queue 106 and sent to the message transmission controller 104 and when the acknowledge message transmission request in the acknowledge register 620 is entered into the acknowledge queue 106, the acknowledge register 620 becomes vacant. At this point, if no acknowledge message transmission request is sent from the acknowledge generating unit 105, the message transmission controller 104 again generates an acknowledge register write event. The event is handled in the same manner as described earlier.

When the queue managed by the processor 120 to accommodate an acknowledge message transmission request is vacated by repeating the above process, the processor 120 clears its remembered state, i.e., one in which the request was being queued. The processor 120 then allows requests for transmission of normal messages other than acknowledge messages to also reach the message transmission controller 104, and terminates the acknowledge message transmission request queuing process.

The second embodiment prevents the acknowledge queue 106 from staying full. This feature ensures that the message reception controller 102 upon receiving a message can always output an acknowledge message transmission request. This in turn makes it possible to receive new messages, which forestalls unfailingly the occurrence of a deadlocked or near-deadlocked state.

The acknowledge message returning function implemented by the network interface controller 10 of the invention may also be used to diagnose the network 10 in FIG. 1 during system startup.

The diagnosis may take place specifically as follows: a network diagnosis message is defined anew as the message type in the format shown in FIGS. 2A and 2B. Upon receipt of the network diagnosis message, the message reception controller 102 in the network interface controller 100 of the receiving node judges it necessary to return an acknowledge message. The message reception controller 102 then forwards an acknowledge message transmission request and necessary information to the acknowledge generating unit 105. The subsequent steps are the same as those discussed above whereby an acknowledge message is returned.

The network diagnosis message differs from the normal message in that the former causes the network interface controller 100 to totally renounce the process of storing messages into its memory. This means that, during system startup, a network diagnosis message can be transmitted as long as the network interface controller 100 of the destination node for which the message is destined is in an operable state. When an acknowledge message is normally returned, it is possible to ascertain that the network route is normal between the node that transmitted the network diagnosis message and the node that received the message.

As described, this invention offers the following major advantages:

(1) The receiving node can return an acknowledge message without recourse to processor intervention. This translates into a shortened period of time in which the acknowledge message is returned in response to the transmitted message. The transmitting node can improve its communication performance by releasing that storage area in the memory which has kept intact the transmit data and the message transmission control word in anticipation of possible message retransmission. The feature also helps to reduce the memory capacity needed for communication purposes.

The receiving node has no need for processor intervention when returning an acknowledge message. This allows the processor to operate uninterrupted, whereby the effective performance of the processor is improved.

(2) Where an acknowledge message is to be returned conventionally through processor intervention, the transmitted message must be received temporarily into the memory. In such a configuration, if the message is not normally received for some reason, nothing can be done to return an acknowledge message. The transmitting node has no means for knowing why the receiving node failed to receive the message. Hence no appropriate measures taken to redress the situation. In the inventive parallel processor, by contrast, the receiving node can return an acknowledge message as long as the packet header of the message received by the network interface controller is normal. Because the acknowledge status code in the acknowledge message informs the transmitting node of the nature of the error, the transmitting node can take appropriate measures to correct or bypass the defect. Illustratively, if an error is detected in the packet body of the message, the transmitting node checks the contents of the acknowledge message and may immediately retransmit the transmit data preserved in anticipation of such an eventuality.

(3) The transmitting node may specify that no acknowledge message be returned by the network interface controller. The feature makes it possible to inhibit unnecessary acknowledge messages from the network interface controller where communication is performed by use of either a protocol required to ensure only limited levels of reliability or, conversely, a protocol required to guarantee enhanced levels of reliability. This boosts communication throughput of the network as a whole.

An acknowledge message may clarify whether the transmitted message was normally received into the user's receiving area or into some other temporary receiving area. Furthermore, the processor is allowed to return an acknowledge message. This makes it possible to deal with a situation wherein the transmitting node cannot complete its transmitting process until and unless the receiving node starts receiving the message into its user's receiving area, as in the case of Synchronous Send of the MPI.

(4) Under control of the network interface controller, an acknowledge message is always given priority over normal messages for transmission. Furthermore, the processor may have acknowledge message transmission requests entered into its own queue. This prevents the occurrence of a deadlocked or near-deadlocked state.

INDUSTRIAL APPLICABILITY

As described, the present invention is adapted advantageously to a parallel processor comprising a plurality of nodes which perform message communications therebetween.

What is claimed is:

1. A parallel processor comprising at least two nodes and a network for interconnecting said nodes which communicate messages therebetween over said network;

wherein each of said nodes has an interface controller for processing transmission and reception of messages to and from said network, and a processor for sending a message transmission request to said interface controller; and wherein said interface controller generates and transmits an acknowledge message corresponding to each message received from said network, said acknowledge message including information identifying the message received.

2. A parallel processor according to claim 1, wherein said interface controller includes:

receiving means for receiving a message from said network;

generating means for generating the acknowledge message based on predetermined information included in the received message; and transmitting means for transmitting the generated acknowledge message to said network.

3. A parallel processor according to claim 2, wherein said generating means includes:

acknowledge requesting means for generating an acknowledge message transmission request based on said predetermined information included in said received message; and message generating means for generating said acknowledge message in response to said acknowledge message transmission request from said acknowledge requesting means.

4. A parallel processor according to claim 3, wherein said message generating means generates a message in response to a message transmission request from said processor, said message generating means further comprising selecting means for selecting an acknowledge message transmission request from said acknowledge requesting means in preference to a message transmission request from said processor if the two requests are in contention.

5. A parallel processor according to claim 3, wherein said generating means further comprises queuing means for temporarily retaining an acknowledge message transmission request from said acknowledge requesting means if the request cannot be received immediately by said message generating means, said queuing means outputting the retained acknowledge message transmission request to said message generating means when said message generating means becomes subsequently ready to receive the request.

6. A parallel processor according to claim 1, wherein a processor interruption occurs in a transmitting node when the transmitting node receives an acknowledge message.

7. A parallel processor according to claim 1, wherein the processor of a transmitting node determines whether a processor interruption is to occur when the transmitting node receives an acknowledge message.

8. A parallel processor according to claim 1, wherein said interface controller verifies the acknowledge message when the node to which the interface controller belongs receives an acknowledge message.

9. A parallel processor, comprising:
at least two nodes; and
a network for interconnecting said nodes which communicate messages therebetween over said network;
wherein each of said nodes has an interface controller for processing transmission and reception of messages to and from said network, and a processor for sending a message transmission request to said interface controller;
wherein said interface controller generates and transmits an acknowledge message corresponding to each message received from said network, said acknowledge message including information notifying receipt of said received message;
wherein said interface controller includes:
receiving means for receiving a message from said network;
generating means for generating the acknowledge message based on predetermined information included in the received message; and
transmitting means for transmitting the generated acknowledge message to said network; and
wherein said interface controller includes:
receiving means for receiving a message from said network;
generating means for generating the acknowledge message based on predetermined information included in the received message; and
transmitting means for transmitting the generated acknowledge message to said network, wherein the transmitted acknowledge message corresponds to the message received form the network;
wherein said message includes acknowledge control information designating whether an acknowledge message is to be returned in response to said message, said receiving means further comprising:
judging means for judging whether it is necessary to return an acknowledge message by referencing said acknowledge control information included in the received message; and
extracting means used when it is judged necessary to return an acknowledge message, said extracting means thereupon extracting predetermined information from said received message and forwarding the extracted information to said generating means.

10. A parallel processor, comprising:
at least two nodes, and
a network for interconnecting said nodes which communicate messages therebetween over said network;
wherein each of said nodes has an interface controller for processing transmission and reception of messages to and from said network, and a processor for sending a message transmission request to said interface controller;
wherein said interface controller generates and transmits an acknowledge message corresponding to each message received from said network, said acknowledge message including information notifying receipt of said received message;
wherein said interface controller includes:
receiving means for receiving a message from said network;
generating means for generating the acknowledge message based on predetermined information included in the received message; and
transmitting means for transmitting the generated acknowledge message to said network; and
wherein said generating means includes:
acknowledge requesting means for generating an acknowledge message transmission request based on said predetermined information included in said received message;
message generating means for generating said acknowledge message in response to said acknowledge message transmission request from said acknowledge requesting means;
queuing means for temporarily retaining an acknowledge message transmission request from said acknowledge requesting means if the request cannot be received immediately by said message generating means, said queuing means outputting the retained acknowledge message transmission request to said message generating means when said message generating means becomes subsequently ready to receive the request,
first holding means for receiving an acknowledge message transmission request from said acknowledge requesting means and sending the request to said queuing means;
time counting means which starts counting when said queuing means and said first holding means are each filled with a maximum allowable number of acknowledge message transmission requests; and
notifying means for notifying said processor that a predetermined period of time has elapsed on said time counting means at the end of the elapsed period; and
wherein said processor further comprises:
second holding means used upon notification from said notifying means, said second holding means thereupon extracting said acknowledge message transmission request from said first holding means and holding the extracted request temporarily; and writing means used when said acknowledge requesting means does not send a new acknowledge message transmission request to said first holding means, said writing means thereupon extracting said acknowledge message transmission request form said second holding means and writing the extracted request to said first holding means.

11. A parallel processor comprising a plurality of nodes and a network for interconnecting said nodes which communicate messages therebetween over said network;

wherein each of said nodes has an interface controller for processing transmission and reception of messages to and from said network, and a processor for sending a message transmission request to said interface controller; and wherein said interface controller includes:

a reception controller for receiving messages from said network;

a transmission controller for generating a message in response to a message transmission request and transmitting the generated message to said network; and an acknowledge generating unit for generating an acknowledge message transmission request including information, identifying the message received by the reception controller from predetermined information included in the message received by said reception controller, said acknowledge generating unit further sending the generated acknowledge message transmission request to said transmission controller, wherein the message transmitted by the transmission controller corresponds to the generated acknowledge message transmission request.

12. A parallel processor according to claim 11, wherein said transmission controller further comprises selecting means for selecting an acknowledge message transmission request from said acknowledge generating unit in preference to a message transmission request from said processor if the two requests are in contention.

13. A parallel processor according to claim 12, wherein said message includes acknowledge control information designating whether an acknowledge message is to be returned in response to said message, said reception controller further comprising:

judging means for judging whether it is necessary to return an acknowledge message by referencing said acknowledge control information included in the received message; and extracting means used when it is judged necessary to return an acknowledge message, said extracting means thereupon extracting predetermined information from said received message and forwarding the extracted information to said acknowledge generating unit.

14. A parallel processor according to claim 11, wherein said interface controller further comprises an acknowledge queue for temporarily retaining an acknowledge message transmission request from said acknowledge generating unit if the request cannot be received immediately by said transmission controller, said acknowledge queue outputting the retained acknowledge message transmission request to said transmission controller when said transmission controller becomes subsequently ready to receive the request.

15. A parallel processor according to claim 14, wherein said interface controller further comprises:

an acknowledge register for receiving an acknowledge message transmission request from said acknowledge generating unit and sending the request to said acknowledge queue;

a timer which starts counting when said acknowledge queue and said acknowledge register are each filled with a maximum allowable number of acknowledge message transmission requests; and notifying means for notifying said processor that a predetermined period of time has elapsed on said timer at the end of the elapsed period; and wherein said processor further comprises:

holding means used upon notification from said notifying means, said holding means thereupon extracting said acknowledge message transmission request from said acknowledge register and holding the extracted request temporarily; and writing means used when said acknowledge generating unit does not send a new acknowledge message transmission request to said acknowledge queue, said writing means thereupon extracting said acknowledge message transmission request from said holding means and writing the extracted request to said acknowledge register.

16. A parallel processor according to claim 11, wherein a processor interruption occurs in a transmitting node when the transmitting node receives an acknowledge message.

17. A parallel processor according to claim 11, wherein the processor of a transmitting node determines whether a processor interruption is to occur when the transmitting node receives an acknowledge message.

18. A parallel processor according to claim 11, wherein said interface controller verifies the message corresponding to the acknowledge message transmission request when the node to which the interface controller belongs receives the message.

19. A message communication method for use with a parallel processor comprising a plurality of nodes and a network for interconnecting said nodes, each of said nodes including an interface controller and a processor, said interface controller processing transmission and reception of messages to and from said network, said processor sending a message transmission request to said interface controller so that messages requested by said processor will be exchanged between nodes over said network, said message communication method comprising the steps of:

allowing said interface controller of a transmitting node, in response to a request from said processor, to transmit a message to at least one receiving node;

causing said interface controller of said receiving node to receive said message over said network;

causing said interface controller of said receiving node to generate an acknowledge message including information notifying receipt with regard to the received message; and causing said interface controller of said receiving node to transmit a message, corresponding to said acknowledge message, to said transmitting node.

20. A message communication method for use with a parallel processor according to claim 19, further comprising the step of causing said interface controller of said receiving node to notify said processor of the receipt of said message either concurrently with generation and returning of said acknowledge message or after the return of said acknowledge message.

21. A message communication method for use with a parallel processor according to claim 19, further comprising the steps of:

if a message transmission request is received from said processor upon generation of said acknowledge message, causing said interface controller of said receiving node to generate said acknowledge message in preference to the message requested by said processor and to return the generated acknowledge message to said transmitting node; and causing said interface controller thereafter to generate said message in response to said message transmission request from said processor and to transmit the generated message.

22. A message communication method for use with a parallel processor according to claim 19, further comprising the steps of:

causing said interface controller of said transmitting node to include into a message, acknowledge control information designating whether said acknowledge message is to be returned, before transmitting said message; and causing said interface controller of said receiving node to reference said acknowledge control information included in said message and to return said acknowledge message if so designated by said acknowledge control information.

23. A message communication method for use with a parallel processor according to claim 22, further comprising the steps of:

causing said interface controller of said transmitting node to include into said message, acknowledge information designating whether said processor is to be notified of the receipt of said acknowledge message from said receiving node, before transmitting said message;

causing said interface controller of said receiving node to extract said acknowledge control information from said message and to include the extracted acknowledge control information into said acknowledge message before returning said acknowledge message; and causing said interface controller of said transmitting node to receive said acknowledge message, reference said acknowledge control message included in the received acknowledge message, and carry out notification to said processor in accordance with said acknowledge control message.

24. A message communication method for use with a parallel processor according to claim 23, further comprising the steps of:

causing said interface-controller of either said transmitting node or said receiving node to include into either said message or said acknowledge message, message type information indicating the type of the message to be transmitted, before transmitting either said message or said acknowledge message; and causing said interface controller of either transmitting node or said receiving node having received either of the two messages to reference said message type information included in the received message in order to recognize the type of the message in question.

25. A message communication method for use with a parallel processor according to claim 23, further comprising the steps of:

causing said interface controller of said receiving node to generate acknowledge status information indicating the type of said acknowledge message reflecting reception status of said message and to include the generated acknowledge status information into said acknowledge message before returning said acknowledge message; and causing said processor notified of the receipt of said acknowledge message to reference said acknowledge status information included therein to recognize the type of said acknowledge message.

26. A message communication method for use with a parallel processor according to claim 19, further comprising the steps of:

allowing each of said nodes to have a first and a second message receiving area for storing received messages;

causing said interface controller of said receiving node to store said message into said first message receiving area concurrently with generation and returning of said acknowledge message; generate a first acknowledge message-including information indicating that said message has been stored into said first message receiving area; return said first acknowledge message to said transmitting node; and notify said processor that said message has been received; and causing said processor to read said message from said first message receiving area; store the retrieved message into said second message receiving area; generate a second acknowledge message including information indicating that said message has been stored in said second message receiving area; and return said second acknowledge message to said transmitting node.

27. A message communication method for use with a parallel processor according to claim 19, further comprising the step of causing a processor interruption in a transmitting node when the transmitting node receives an acknowledge message.

28. A message communication method for use with a parallel processor according to claim 19, further comprising the step of determining whether a processor interruption is to occur when a transmitting node receives an acknowledge message.

29. A message communication method for use with a parallel processor according to claim 19, further comprising the step of causing the interface controller to verify the acknowledge message when the node to which the interface controller belongs receives an acknowledge message.

* * * * *